(12) United States Patent
Misso

(10) Patent No.: US 6,371,654 B1
(45) Date of Patent: Apr. 16, 2002

(54) ACTUATOR BEARING CARTRIDGE FOR DISC STORAGE SYSTEM

(75) Inventor: Nigel F. Misso, Bethany, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/481,889

(22) Filed: Jan. 12, 2000

Related U.S. Application Data

(60) Provisional application No. 60/140,862, filed on Jun. 24, 1999.

(51) Int. Cl.[7] ............ F16C 33/60; F16C 19/28; G11B 5/48
(52) U.S. Cl. ............ 384/499; 384/504; 384/510; 384/512; 384/517
(58) Field of Search ................ 384/499, 500, 384/502, 504, 510, 512, 517, 543, 544; 360/106, 99.08

(56) References Cited

U.S. PATENT DOCUMENTS

| | | | |
|---|---|---|---|
| 1,325,910 A | * 12/1919 | Reynolds | 384/504 |
| 1,418,888 A | 6/1922 | Sellew | |
| 1,941,366 A | * 12/1933 | Searles et al. | 384/512 |
| 2,731,311 A | 1/1956 | Schwartz | |
| 4,106,827 A | 8/1978 | Ducret et al. | |
| 4,138,169 A | 2/1979 | Stolz et al. | |
| 4,425,009 A | 1/1984 | Fillon et al. | |
| 4,505,525 A | 3/1985 | Wolzenburg | |
| 4,683,767 A | 8/1987 | Weyer | |
| 4,729,674 A | 3/1988 | Siebert et al. | |
| 4,754,353 A | 6/1988 | Levy | |
| 4,810,108 A | * 3/1989 | Yajima | 384/537 |
| 4,858,486 A | 8/1989 | Weyer | |
| 4,984,115 A | 1/1991 | Takahashi et al. | |
| 5,146,450 A | 9/1992 | Brooks et al. | |
| 5,473,489 A | 12/1995 | Sanada | |
| 5,507,094 A | 4/1996 | Lederman | |
| 5,529,404 A | 6/1996 | Robinson et al. | |
| 5,556,209 A | 9/1996 | Obara et al. | |
| 5,599,111 A | 2/1997 | Miyazaki et al. | |
| 5,606,475 A | * 2/1997 | Ishizuka | 384/543 |
| 5,655,846 A | 8/1997 | Obara | |
| 5,715,117 A | 2/1998 | Brooks | |
| 5,754,372 A | 5/1998 | Ramsdell et al. | |
| 5,806,989 A | 9/1998 | Obara et al. | |
| 5,808,388 A | 9/1998 | Obara | |
| 5,818,665 A | 10/1998 | Malagrino, Jr. et al. | |
| 5,914,836 A | 6/1999 | Pottebaum | |

FOREIGN PATENT DOCUMENTS

| | | | |
|---|---|---|---|
| EP | 0 190 400 A1 | 8/1986 | |
| JP | 3-222661 A | * 10/1991 | |
| JP | 4-113022 A | * 4/1992 | 384/504 |

OTHER PUBLICATIONS

Mark's Standard Handbook for Mechanical Engineers, tenth edition, Eugene A. Avallone, McGraw-Hill, pp. 6-130 thru 6-131 and 13-30.*

* cited by examiner

*Primary Examiner*—Thomas R. Hannon
*Assistant Examiner*—William C Joyce
(74) *Attorney, Agent, or Firm*—Westman, Champlin & Kelly, P.A.

(57) ABSTRACT

A pivot bearing cartridge for an actuator in a disc storage system includes a shaft, a first outer sleeve and a second outer sleeve. The first and second outer sleeves are coupled together. Raceways are formed in the sleeves and the shaft. The raceways carry balls to form ball bearings allowing movement of the sleeves relative to the shaft.

10 Claims, 4 Drawing Sheets

ACTUATOR BEARING CARTRIDGE FOR DISC STORAGE SYSTEM

CROSS-REFERENCE TO CO-PENDING APPLICATION

This application claims priority benefits from U.S. provisional patent application Serial No. 60/140,862, filed Jun. 24, 1999, and entitled "STIFF BEARING CARTRIDGE FOR DISC DRIVES".

FIELD OF THE INVENTION

The present invention relates generally to disc storage systems. More specifically, the present invention relates to an actuator of the type used in disc storage systems.

BACKGROUND OF THE INVENTION

Disc drives are used to store information, for example magnetically or optically. Disc drives have typically found uses with computer systems to store and retrieve large amounts of data in a fast and efficient manner. There has been an ongoing movement in disc drives to increase drive capacity and the data transfer rates.

A disc drive typically includes at least one disc having a recording surface which rotates about a spindle motor. A transducing head is positioned adjacent the recording surface of the disc and is configured to read and write information on the disc surface. During operation, movement of the disc causes the transducing head to "fly" over the disc surface at an extremely small spacing. The transducing head is carried on an actuator assembly which is used to move the transducing head radially relative to the disc surface such that various areas of the disc surface can be accessed. Some actuator assemblies include a bearing cartridge in which a sleeve is configured to rotate relative to a shaft. As recording densities have increased, even a small axial misalignment between the shaft and the sleeve can cause misalignment of the transducing head relative to the disc surface. This can be particularly problematic when rapid movement of the transducing head causes additional force to be applied to the bearing cartridge. This can also make the actuator susceptible to external shocks or vibrations. The bearing cartridge typically includes at least two pairs of races, each carrying ball bearings to allow rotation between the sleeve and the shaft. Misalignment and poor tolerance between the components can lead to errors in positioning the head. Examples of two piece sleeves are shown in, for example, U.S. Pat. Nos. 1,418,888, 4,106,827, 4,138,169 and 4,425,009. These references show sleeves which are in butt contact or which require separate raceways for the bearing assemblies.

The present invention provides a solution to this and other problems and offers advantages over the prior art.

SUMMARY OF THE INVENTION

The present invention relates to bearing cartridges which have a shaft and a sleeve which solve the above-mentioned problem.

In accordance with one embodiment of the invention, a pivot bearing cartridge for use in an actuator assembly includes a shaft. The shaft includes a first shaft raceway and a second shaft raceway, each extending around a circumference of the shaft. A first outer sleeve extends around the circumference of the shaft and includes a first sleeve raceway generally aligned with the first shaft raceway. A second outer sleeve, coupled to the first sleeve, extends around the circumference of the shaft and includes a second sleeve raceway generally aligned with the second shaft raceway. First ball bearings are provided between the first shaft and first sleeve raceways and second ball bearings are provided between the second shaft and second sleeve raceways.

These and various other features as well as advantages which characterize the present invention will be apparent upon reading of the following detailed description and review of the associate drawings.

DETAILED DESCRIPTION OF ILLUSTRATIVE EMBODIMENTS

Figure 1:
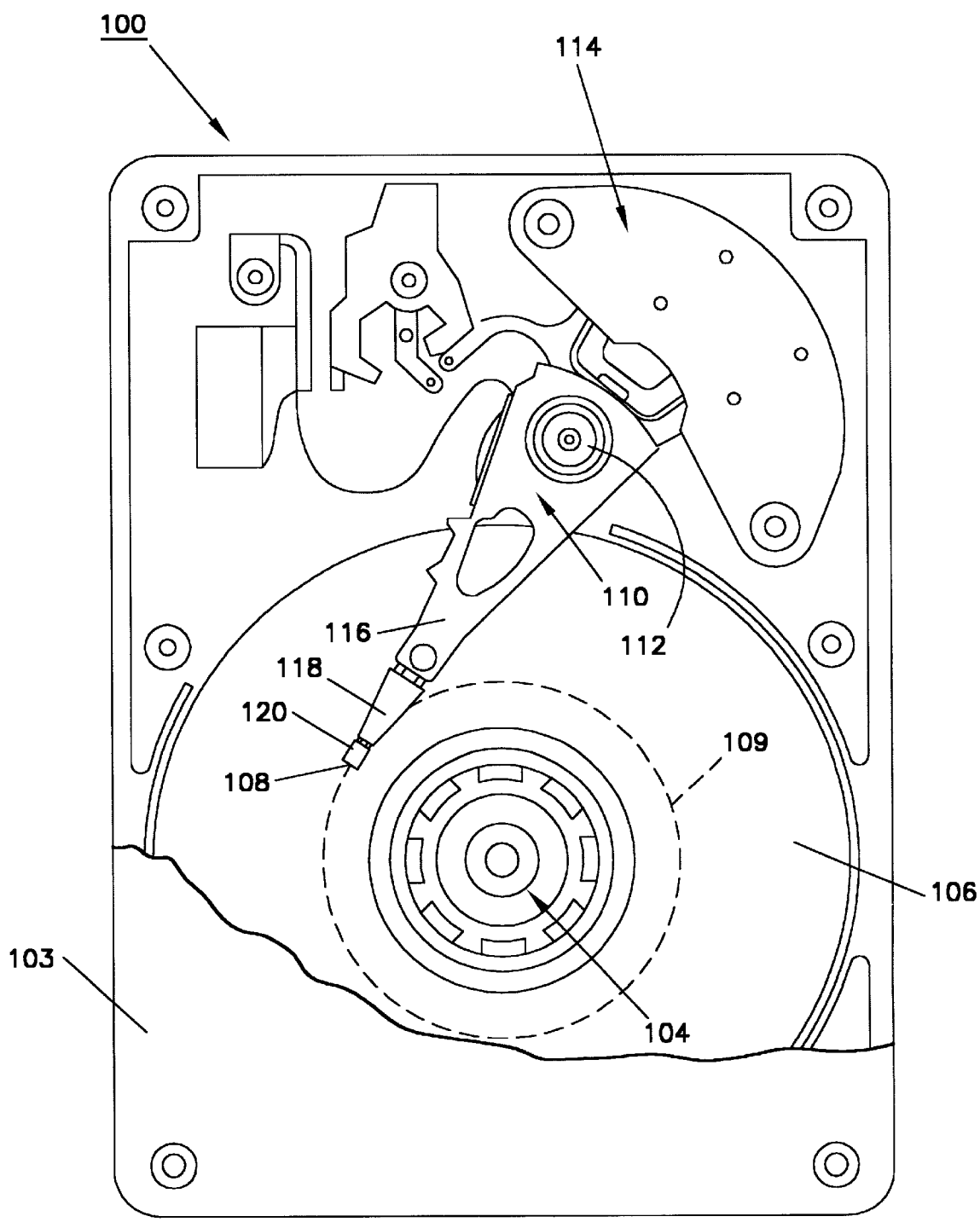
FIG. 1 is a top plan view of a disc storage system including an actuator having a bearing cartridge in accordance with the present invention.

Referring now to FIG. 1, a disc storage system 100 is shown. A system, like the one shown in FIG. 1, includes a housing 103 which carries one or more discs 106 therein. Disc 106 rotates about spindle motor 104. Disc 106 includes a surface carrying a track 109. A transducing head 108 is carried on a slider 120 which is generally aligned with track 109. An actuator assembly 110 is operated by a voice coil motor (VCM) 114 which rotates an armature 116 about a bearing cartridge 112. Actuator armature 116 couples to flexure 118 which carries slider 120. Transducing head 108 can be moved radially across the surface of disc 106 using voice coil motor 114 which causes armature to rotate about the pivot bearing cartridge 112.

Figure 2:
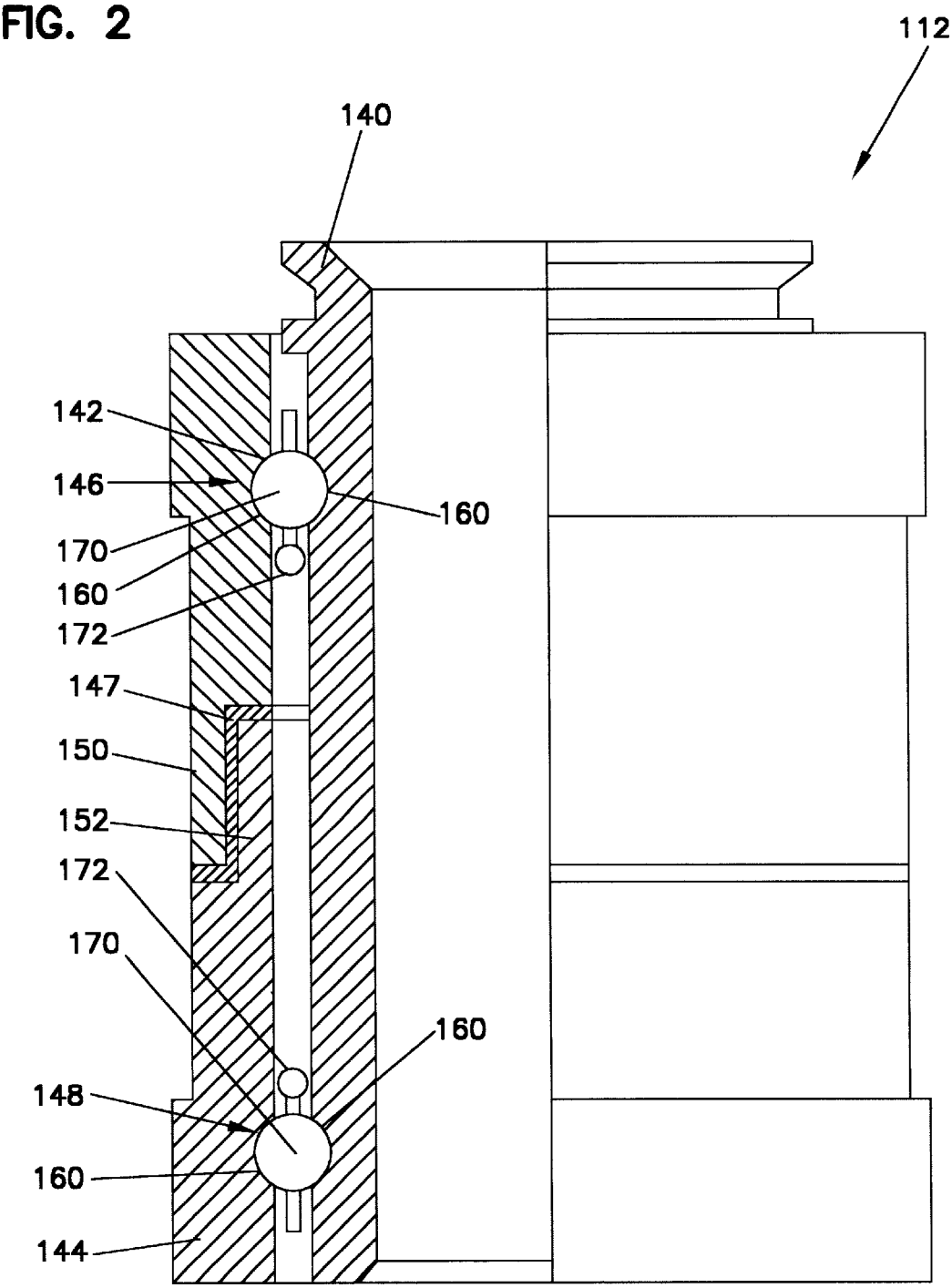
FIG. 2 is a side partial cross-sectional view of the bearing cartridge used in the actuator assembly of FIG. 1.

Referring now to FIG. 2, a side plan view and partial cutaway view of pivot bearing cartridge 112 in accordance with the present invention is shown. Pivot bearing cartridge 112 includes an inner shaft 140 which is configured to couple to housing 103. An upper outer sleeve 142 extends around a circumference of shaft 140 as does a lower outer sleeve 144. An upper ball bearing 146 is formed between upper sleeve 142 and inner shaft 140 allowing relative rotation therebetween. Similarly, a lower ball bearing 148 is formed between lower outer sleeve 144 and inner shaft 140.

In accordance with one aspect of the present invention, upper outer sleeve 142 is bonded to lower outer sleeve 144 at bond 147. In the particular embodiment shown, the bond 147 is formed between lips 150 and 152 of upper sleeve 142 and lower sleeve 144, respectively. The lips 150 and 152 are provided for one preferred embodiment and other techniques can also be used in the present invention. Bond 147 between sleeves 142 and 144 can be, for example, a weld formed by laser or electron-beam welding, or an adhesive such as epoxy. Other attachment techniques can also be used. Bond 147 allows the upper sleeve 142 and lower sleeve 144 to rotate as a single unit relative to inner shaft 140. Actuator armature 116 is coupled to upper sleeve 142 and lower sleeve 144 allowing rotation relative to shaft 140.

Figure 3:
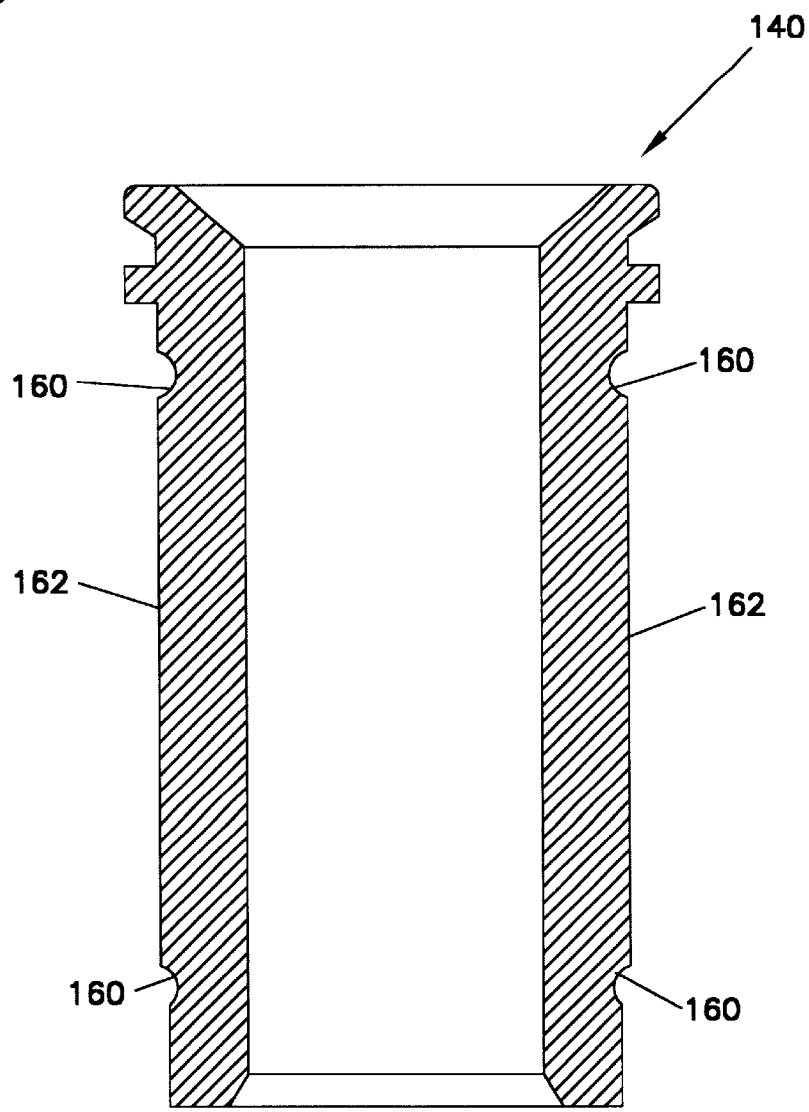
FIG. 3 is a side cross-sectional view of an inner shaft of the bearing cartridge of FIG. 2.

In another aspect of the present invention, ball bearings 146 and 148 include raceways 160 which are formed directly in sleeves 142 and 144 and shaft 140. This is in contrast to typical prior art raceways which are separate elements coupled to prior art sleeves or shafts. FIG. 3 is side cross-sectional view of shaft 140 showing raceways 160 formed in outer circumference 162 of shaft 140. These raceways 160 can be formed through machining or molding techniques, for example. Raceways 160 formed on sleeves 142 and 144 can be fabricated in a similar manner.

Figure 4:
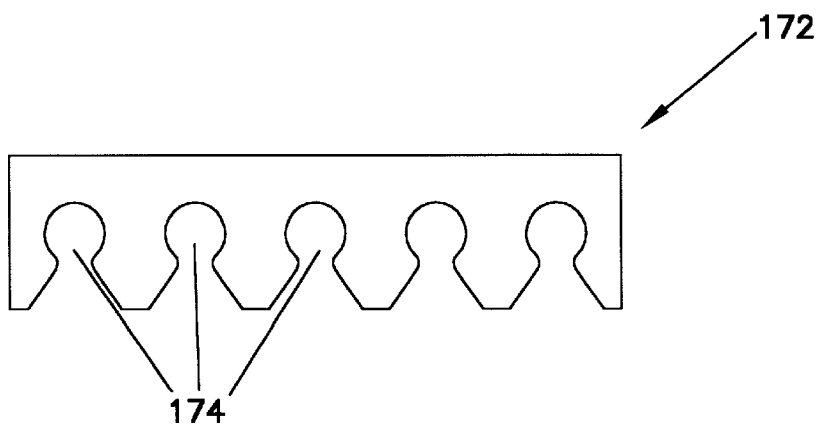
FIG. 4 is a plan view of a bearing retainer of the bearing cartridge of FIG. 2.

Referring back to FIG. 2, balls 170 are shown carried in ball bearings 146 and 148. Balls 170 are spaced around the circumference 162 of shaft 140 and fit in raceways 160. Balls 170 are held in place by bearing retainers 172 which extend around circumference 162 of shaft 140. FIG. 4 is a side plan view of bearing retainer 172. Bearing retainer 172 includes openings 174 formed therein which are adapted to receive balls 170.

The present invention reduces the number of components in pivot bearing cartridges and allows easier assembly with reduced costs. Additionally, the bearing cartridge can be fabricated to have improved stiffness in comparison to typical prior art designs. This is because the bearing cartridge does not require separate raceways to carry the balls of the ball bearing. This allows the sleeve and shaft to be thicker without causing the overall width of the bearing cartridge to increase. Further, prior art raceways tend to be a source of stiffness reduction. As the separate raceways are eliminated in one aspect of the invention, the bearing cartridge of the invention has improved stiffness.

A bearing cartridge in accordance with the present invention can be assembled by securing inner shaft 140 in a fixture. Upper outer sleeve 142 is axially aligned with shaft 140. Sleeve 142 is then radially offset to load balls 160 which causes sleeve 142 to become radially centered about shaft 140. Bearing retainers can be prelubricated and urged into balls 170. A similar process can then be followed to load lower sleeve 144 onto shaft 140. Any additional components can also be installed such as shields. The bearings can be preloaded and lips 150 and 152 can be bonded together. Bearing preload can be accomplished by pulling sleeves 142 and 144 apart after assembly, but prior to welding or bonding of lips 150, 152. During the assembly process and prior to coupling lips 15o and 152, one aspect of the present invention allows rotation of sleeve 142 relative to sleeve 144.

Figure 5:
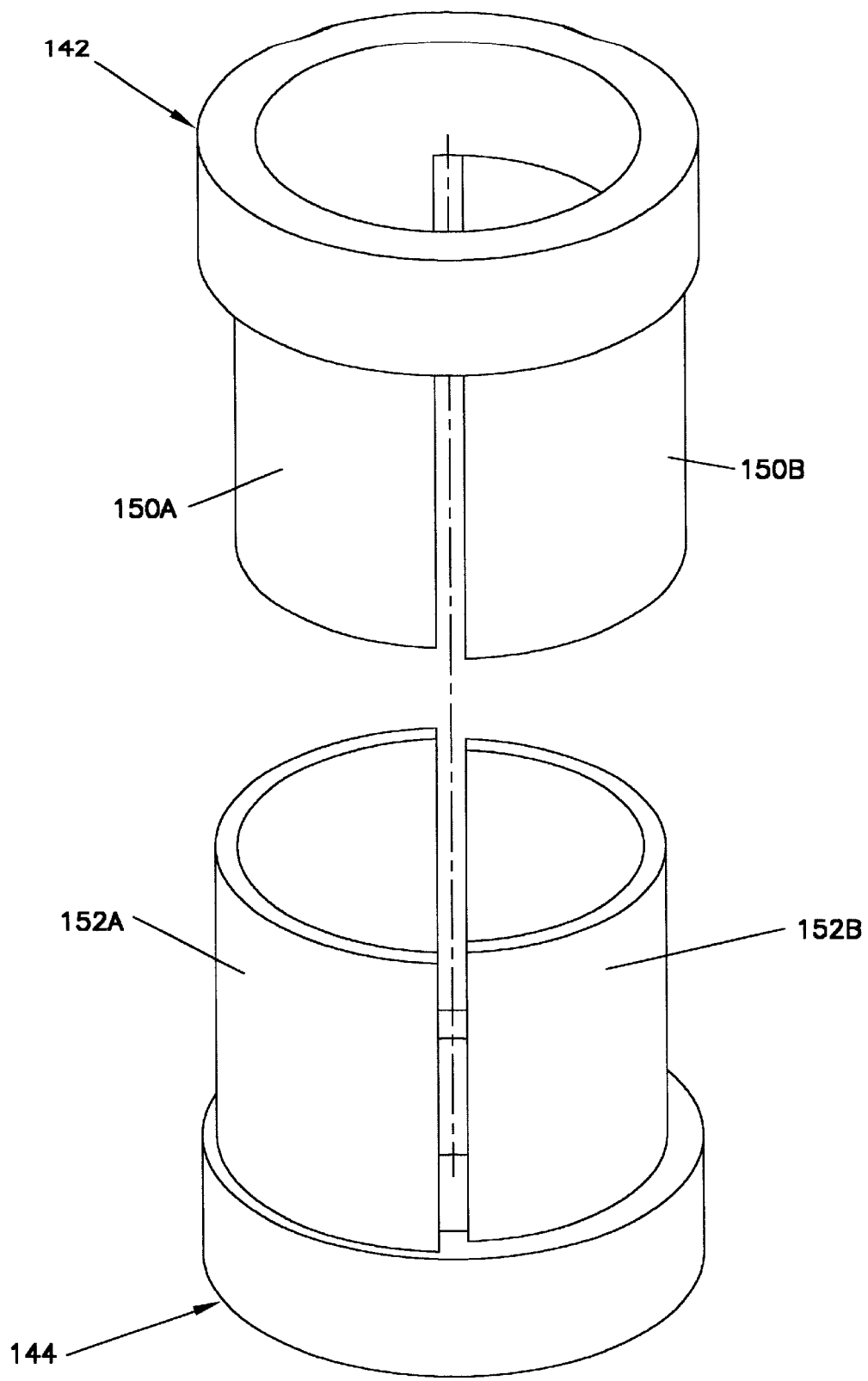
FIG. 5 is an exploded perspective view of sleeves of a bearing cartridge in accordance with one embodiment.

FIG. 5 is an exploded perspective view of one embodiment of sleeves 142, 144 and shows the relationship between lips 150, 152. Lip 150 is formed of two lips, 150A having a smaller diameter and 150B having a larger diameter. Lip 150A mates with larger diameter lip 152A of lip 150. Similarly, lip 150B mates with smaller diameter lip 152B. This configuration prevents relative rotation of sleeves 142, 144.

The present invention provides a pivot bearing cartridge 112 for use in an actuator assembly 110. The bearing cartridge 112 includes a shaft 140 including first and second shaft raceways 160 extending around a circumference 162 of the shaft 140. First and second outer sleeves 142, 144 extend around the circumference 162 of the shaft and include first and second sleeve raceways 16o generally aligned with the raceways 160 on the shaft 140. Balls 170 are provided in the raceways 160 to allow relative rotation of movement between the shaft 140 and the sleeves 142, 144.

In one aspect of the invention, the raceways 160 comprise grooves formed in the shaft 140 and the sleeves 142, 144. The first and second sleeves 142, 144 include respective lips 150, 152 which fit together thereby coupling the sleeves together. The sleeves can be coupled at the lips through a weld, such as a laser weld or an electron-beam weld. In another example, an adhesive is used to attach the sleeves together such as epoxy. Bearing retainers 172 are provided to retain the balls 170 in position in the raceways 160. In another aspect of the invention, at least one additional sleeve is provided. The bearing retainer 172 can comprise a ring having openings 174 formed therein which are adapted to receive the balls 170.

A disc storage system 100 includes a pivot bearing cartridge 112 in accordance with the present invention for use in an actuator assembly 110. The actuator assembly is used to position a transducing head 108 over a surface of a storage disc 106. The actuator assembly 110 pivots about the bearing cartridge 112. In a disc storage system 100, disc means 106 is provided for carrying information. A transducing means 108 is provided for reading and writing information on the disc means 106. An actuator means 110 is used for moving the transducing means 108 relative to the surface of the disc means 106. An actuator bearing means 112 is used for allowing rotational movement of the actuator means 110.

It is to be understood that even though numerous characteristics and advantages of various embodiments of the present invention have been set forth in the foregoing description, together with details of the structure and function of various embodiments of the invention, this disclosure is illustrative only, and changes may be made in details, especially in matters of structure and arrangement of parts within the principles of the present invention to the full extent indicated by the broad general meaning of the terms in which the appended claims are expressed. For example, the particular elements may vary depending on the particular application for the bearing cartridge while maintaining substantially the same functionality without departing from the scope and spirit of the present invention. For example, the invention may be utilized with any number of sleeves. The additional sleeves can optionally include a raceway which would be aligned with an additional raceway in the shaft 140. Typically, any additional sleeves are provided in pairs. This cartridge design is applicable to multiple actuator drives which have a common shaft. In addition, although the preferred embodiment described herein is directed to an actuator bearing for a disc storage system, it will be appreciated by those skilled in the art that the teachings of the present invention can be applied to other systems, like motors or devices which employ a bearing, without departing from the scope and spirit of the present invention.

What is claimed is:

1. A pivot bearing cartridge for use in an actuator assembly, the bearing cartridge comprising:

a shaft including first and second shaft raceways extending around a circumference of the shaft;

a first outer sleeve extending around the circumference of the shaft including a first sleeve raceway generally aligned with the first shaft raceway and first and third lips;

a second outer sleeve coupled to the first outer sleeve and extending around the circumference of the shaft, the second sleeve including a second sleeve raceway generally aligned with the second shaft raceway and second and fourth lips, wherein the first lip has a diameter that is less than a diameter of the second lip and the third lip has a diameter that is greater than a diameter of the fourth lip, whereby the first lip fits within the second lip and the fourth lip fits within the third lip, thereby coupling the first sleeve to the second sleeve and preventing rotation between the first and second sleeves; and first balls in the first shaft and first sleeve raceways and second balls in the second shaft and second sleeve raceways.

2. The pivot bearing cartridge of claim 1 wherein raceways comprise grooves formed in the shaft, first outer sleeve and second outer sleeve.

3. The pivot bearing cartridge of claim 1 wherein the first sleeve is coupled to the second sleeve by a weld.

4. The pivot bearing cartridge of claim 3 wherein the weld comprises a laser weld.

5. The pivot bearing cartridge of claim 3 wherein the weld comprises an electron-beam weld.

6. The pivot bearing cartridge of claim 1 wherein the first sleeve is coupled to the second sleeve by adhesive.

7. The pivot bearing cartridge of claim 6 wherein the adhesive comprises an epoxy.

8. The pivot bearing cartridge of claim 1 including bearing retainers configured to position the first and second balls in the raceways.

9. The pivot bearing cartridge of claim 8 wherein the bearing retainers comprise rings with openings formed therein adapted to receive the balls.

10. A disc storage system having an actuator including a pivot bearing cartridge in accordance with claim 1.

* * * * *